United States Patent
Daigle et al.

(10) Patent No.: US 10,193,145 B2
(45) Date of Patent: Jan. 29, 2019

(54) CARBON-COATED ACTIVE PARTICLES AND PROCESSES FOR THEIR PREPARATION

(71) Applicants: HYDRO-QUÉBEC, Montréal, Québec (CA); SONY CORPORATION, Minato-ku, Tokyo (JP)

(72) Inventors: Jean-Christophe Daigle, St-Bruno-de-Montarville (CA); Yuichiro Asakawa, Montréal (CA); Shinichi Uesaka, Westmount (CA); Karim Zaghib, Longueuil (CA)

(73) Assignees: HYDRO-QUEBEC, Montreal, Quebec (CA); MURATA MANUFACTURING CO., LTD, Kyoto (JP)

( * ) Notice: Subject to any disclaimer, the term of this patent is extended or adjusted under 35 U.S.C. 154(b) by 280 days.

(21) Appl. No.: 15/199,313

(22) Filed: Jun. 30, 2016

(65) Prior Publication Data

US 2018/0006299 A1  Jan. 4, 2018

(51) Int. Cl.
| | |
|---|---|
| *H01M 4/131* | (2010.01) |
| *H01M 4/36* | (2006.01) |
| *H01M 4/485* | (2010.01) |
| *H01M 4/505* | (2010.01) |
| *H01M 4/525* | (2010.01) |
| *H01M 4/62* | (2006.01) |
| *H01M 10/0525* | (2010.01) |

(Continued)

(52) U.S. Cl.
CPC .............. *H01M 4/366* (2013.01); *C01B 32/15* (2017.08); *H01M 4/131* (2013.01); *H01M 4/485* (2013.01); *H01M 4/505* (2013.01); *H01M 4/525* (2013.01); *H01M 4/5825* (2013.01); *H01M 4/622* (2013.01); *H01M 4/623* (2013.01); *H01M 4/625* (2013.01); *H01M 10/0525* (2013.01)

(58) Field of Classification Search
CPC .............................. H01M 4/131; H01M 4/485
See application file for complete search history.

(56) References Cited

U.S. PATENT DOCUMENTS

| | | | |
|---|---|---|---|
| 2016/0164081 A1 | 6/2016 | Cui et al. | |
| 2016/0172665 A1 | 6/2016 | Zhou et al. | |

FOREIGN PATENT DOCUMENTS

| | | | |
|---|---|---|---|
| CN | 1986429 A | 6/2007 | |
| CN | 102290567 A | 12/2011 | |
| CN | 105655548 A | 6/2016 | |

OTHER PUBLICATIONS

Ding et al., "Towards Understanding the Effects of Carbon and Nitrogen-Doped Carbon Coating on the Electrochemical Performance of Li4Ti5O12 in Lithium Ion Batteries: A Combined Experimental and Theoretical Study," Phys. Chem. Chem. Phys., (Sep. 7, 2011), vol. 13, No. 33, pp. 15127-15133.

(Continued)

*Primary Examiner* — Olatunji A Godo
(74) *Attorney, Agent, or Firm* — Buchanan Ingersoll & Rooney P.C.

(57) ABSTRACT

A process for the preparation of carbon-coated particles, where the particles include an electrochemically active material. The process includes the steps of emulsion polymerization, drying and thermally treating the polymer to obtain a nano-layer of carbon on the particles, where the carbon layer includes fibers and nitrogen-containing polyaromatics have a graphene-like structure. Also, the particles produced by the method as well as to electrode materials, electrodes and electrochemical cells including the particles.

18 Claims, 9 Drawing Sheets

(51) Int. Cl.
    *H01M 4/58*     (2010.01)
    *C01B 32/15*     (2017.01)

(56) References Cited

OTHER PUBLICATIONS

Ferchichi et al., "Pickering Emulsion Polymerization of Polyaniline/LiCoO2 Nanoparticles Used as Cathode Materials for Lithium Batteries," Ionics, (Sep. 2014), vol. 20, Issue 9, pp. 1301-1314.

He et al., "Carbon Coating to Suppress the Reduction Decomposition of Electrolyte on the Li4Ti5O12 Electrode," Journal of Power Sources, (Mar. 2012), vol. 202, pp. 253-261.

Okada et al., "Fabrication of Mesoporous Polymer Monolith: A Template-Free Approach," Chemical Communications, (Jul. 2011), vol. 47, No. 26, pp. 7422-7424.

Rahaman et al., "A Review of Heat Treatment on Polyacrylonitrile Fiber," Polymer Degradation and Stability, (Aug. 2007), vol. 92, Issue 8, pp. 1421-1432.

Zaghib et al., "LiFePO4: From Molten Ingot to Nanoparticles with high-Rate Performance in Li-ion Batteries," Journal of Power Sources, (Dec. 2010), vol. 195, Issue 24, pp. 8280-8288.

Zhu et al., "Carbon-Coated Nano-Sized Li4Ti5O12 Nanoporous Micro-Sphere as Anode Material for High-Rate Lithium-ion Batteries," Energy & Environmental Science, (2011) vol. 4, pp. 4016-4022.

Zhu et al., "A Comprehensive Study of Effects of Carbon Coating on Li4Ti5O12 Anode Material for Lithium-Ion Batteries," Journal of the Electrochemical Society, (2011), vol. 158, No. 2, pp. A102-A109.

Rahaman M, S. A. et al."A review of heat treatment on polyacrylonitrile fiber" Elsevier, Polymer Degradation and Stability, vol. 92, No. 8, Aug. 2007, pp. 1421-1432. Cited in application "Introduction".

International Search Report and Written Opinion (Forms PCT/ISA/220 and PCT/ISA/237) dated Sep. 27, 2017, by the International Searching Authority in corresponding International Application No. PCT/CA2017/050797, 11 pages.

CARBON-COATED ACTIVE PARTICLES AND PROCESSES FOR THEIR PREPARATION

TECHNICAL FIELD

The technical field generally relates to processes for the coating of inorganic material particles with carbon, for instance, inorganic materials used in lithium-ion batteries, and to the materials obtained by the process and their use.

BACKGROUND

Coating particles of active materials (e.g. lithium titanate (LTO), $TiO_2$ or others) with carbon is one way of avoiding contact between the active material and electrolyte, thereby preventing degradation of the electrolyte and the formation of gas inside the cell. The carbon coating creates a physical barrier and also enhances the material's electronic conductivity. Carbon can thus be applied on any active materials where improved stability and/or electronic conductivity is required or desirable (see He, Y.-B. et al., *J. Power Sources*, 2012, 202, 253-261, incorporated by reference in its entirety for all purposes).

One of the most common ways of applying a carbon coating on inorganic materials (LFP, LTO, $TiO_2$ etc.) for lithium batteries includes the use of a sugar or sugar derivative as a carbon source. The sugar is mixed with the active material, for instance in a solvent, and carbonized at high temperature (see (a) Zaghib, K. et al., *J. Power Sources*, 2010, 195 (24), 8280-8288; (b) Zhu, G.-N. et al., *J. Electrochem. Soc.*, 2011, 158 (2), A102-A109, both incorporated by reference in their entirety for all purposes). This process generally does not allow for the formation of a thin coating on primary particles and/or inside the pores of the particles. Additionally, the electronic conductivity of commercial carbon coated material produced by this method is limited to about $10^{-6}$ S/cm. It is thus not trivial to achieve the formation of a nano-layer of carbon on active particles using the sugar carbonization method.

SUMMARY

According to one aspect, the present application relates to a process for producing carbon-coated particles, the process comprising the steps of:
a. forming an emulsion by mixing particles, acrylonitrile monomers, and an aqueous solvent, said particles comprising an electrochemically active material;
b. polymerizing the acrylonitrile monomers in the mixture of step (a) by emulsion polymerization;
c. drying the particles from step (b) to form a nano-layer of poly(acrylonitrile) at the surface of the particles; and
d. thermally treating the dried particles of step (c) to form the carbon-coated particles, said carbon consisting of a nano-layer of carbon comprising fibers on the surface of the particles.

In one embodiment, step (a) further comprises the addition of a polymerization initiator. In another embodiment, wherein step (b) further comprises degassing the emulsion and heating the emulsion under inert atmosphere at a temperature of 50° C. to 90° C. and for a time period of between 5 and 15 hours. In another embodiment, the emulsion is formed in step (a) using sonication, high power stirring, or any high shear agitation technique.

According to one embodiment, the drying step (c) is carried out without any previous purification step, e.g., without any previous purification step since forming the emulsion. In another embodiment, the drying step (c) of the present process comprises spray-drying of the particles. For instance, spray-drying is carried out at a temperature in the chamber above the boiling point of the solvent, e.g. at least 100° C. or between 100° C. and 120° C. Alternatively, the applied temperature in the spray dryer is of between 120° C. and 250° C.

In a further embodiment, the thermal treatment step (d) of the present process is a carbonization step. For example, the carbonization step comprises heating the particles at a temperature of at least 500° C. In one example, the carbonization step further comprises at least one temperature ramp. For example, the carbonization step comprises:
progressively heating the particles having a nano-layer of poly(acrylonitrile) at the surface using a ramp of temperature from a temperature close to room temperature up to at least 200° C., with an increase rate of between 3° C./min and 10° C./min, for instance, about 5° C./min;
keeping the temperature to at least 200° C. for a period of 30 minutes to 2 hours; and
further heating the particles under inert atmosphere with an increase rate of between 3° C./min and 10° C./min, for instance, about 5° C./min, up to a final temperature of at least 500° C., for instance, the final temperature is of at least 600° C.

In one example, the inert atmosphere in the second heating step of the carbonization is selected from argon, nitrogen, carbon dioxide or a mixture thereof. For instance, the inert gas is a mixture of argon and carbon dioxide having a ratio $Ar/CO_2$ of between about 60:40 to about 90:10, or about 70:30 to about 80:20, or of about 75:25.

According to one embodiment, the electrochemically active material comprises a material as defined herein, for instance, selected from the group consisting of titanates, lithium titanates, lithium metal phosphates, vanadium oxides and lithium vanadium oxides, lithium metal oxides, and combinations thereof.

According to another aspect, the present application relates to a process for producing carbon-coated LTO particles, the process comprising the steps of:
a. forming a Pickering emulsion comprising particles, acrylonitrile monomers, a polymerization initiator and an aqueous solvent, said particles comprising LTO as an electrochemically active material;
b. polymerizing the acrylonitrile monomers by emulsion polymerization to form poly(acrylonitrile) on a surface of the particles and inside the pores;
c. spray drying the polymerized particles of step (b) to obtain dried particles having a nano-layer of poly (acrylonitrile) at their surface; and
d. carbonizing the dried particles of step (c) to form a carbon coating comprising carbon fibers on the surface of the particles.

The present application also relates to carbon-coated particles, for instance, produced by a process as herein defined. In one embodiment, the particles produced are coated with a nano-layer of carbon comprising carbon fibers and polyaromatics (i.e. graphene-like structure) consisting of carbon and nitrogen atoms. In one embodiment, the electrochemically active material comprises a material selected from the group consisting of titanates, lithium titanates, lithium metal phosphates, vanadium oxides, lithium metal oxides, and combinations thereof, preferably lithium titanates or lithium metal phosphates. For instance, the electrochemically active material is selected from $TiO_2$, $Li_2TiO_3$, $Li_4Ti_5O_{12}$, $H_2Ti_5O_{11}$ and $H_2Ti_4O_9$, or a combination thereof, $LiM'PO_4$ wherein M' is Fe, Ni, Mn, Co, or a combination thereof, $LiV_3O_8$, $V_2O_5$, $LiMn_2O_4$, $LiM''O_2$, wherein M'' is Mn, Co, Ni, or a combination thereof, $Li(NiM''')O_2$, wherein M''' is Mn, Co, Al, Fe, Cr, Ti, or Zr, and combinations thereof. In one embodiment, the electrochemically active material is $Li_4Ti_5O_{12}$. In another embodiment, the electrochemically active material is $LiM'PO_4$ wherein M' is Fe, Ni, Mn, Co, or a combination thereof, for instance, where M' comprises Fe.

According to one aspect, the present application relates to an electrode material comprising carbon-coated particles as herein defined or as produced by the present process, together with a binder. For instance, the binder is selected from SBR (styrene butadiene rubber) optionally with a thickening agent such as CMC (carbomethoxy cellulose), PAA (poly(acrylic acid)), PMMA (poly(methacrylic acid)), polyvinylidene fluoride (PVDF), polytetrafluoroethylene (PTFE), NBR (butadiene acrylonitrile rubber), HNBR (hydrogenated NBR), CHR (epichlorohydrin rubber), ACM (acrylate rubber), and combination thereof. For example, the binder comprises PAA and a binder soluble in an aqueous solvent (e.g. SBR, NBR, HNBR, CHR, and/or ACM).

The present application also further relates to an electrode comprising carbon-coated particles as herein defined or as produced by the present process, or an electrode material as herein defined, on a current collector. Electrochemical cells comprising an electrode as herein defined, an electrolyte and a counter-electrode are also contemplated as well as their use, for example, in electrical or hybrid vehicles, or in ubiquitous IT devices.

Other features and advantages of the present technology will be better understood upon reading of the description herein below with reference to the appended drawings.

DETAILED DESCRIPTION

This application relates to a process for the preparation of electrode active material, more specifically, carbon coated electrochemically active inorganic particles.

In the present technology, the carbon coating is achieved by emulsion polymerization. This process is green and allows for the direct use of water dispersion in spray drying without further purification. For instance, the method comprises the following three main steps: 1) emulsion polymerization of poly(acrylonitrile) on inorganic particles, 2) evaporation of volatile components by spray-drying resulting in dried polymer-coated particles, and 3) carbonization of the polymer to form a carbon coating comprising carbon fibers. For instance, the carbonization step is achieved by heat treatment as described in Rahaman, M. S. A. et al., *Polymer Degradation and Stability*, 2007, 92 (8), 1421-1432.

The particles to be coated using the present method include inorganic particles of electrochemically active materials, such as metal oxides and complex oxides. Examples of electrochemically active materials include, without limitation, titanates and lithium titanates (e.g. $TiO_2$, $Li_2TiO_3$, $Li_4Ti_5O_{12}$, $H_2Ti_5O_{11}$, $H_2Ti_4O_9$), phosphates (e.g. $LiM'PO_4$ where M' is Fe, Ni, Mn, Co, or a combination thereof), vanadium oxides (e.g. $LiV_3O_8$, $V_2O_5$, and the like), and other lithium and metal oxides such as $LiMn_2O_4$, $LiM''O_2$ (M'' being Mn, Co, Ni, or a combination thereof), $Li(NiM''')O_2$ (M''' being Mn, Co, Al, Fe, Cr, Ti, Zr, and the like, or a combination thereof), or a combination thereof. The particles are freshly formed or of commercial source and may be microparticles or nanoparticles.

Figure 1:
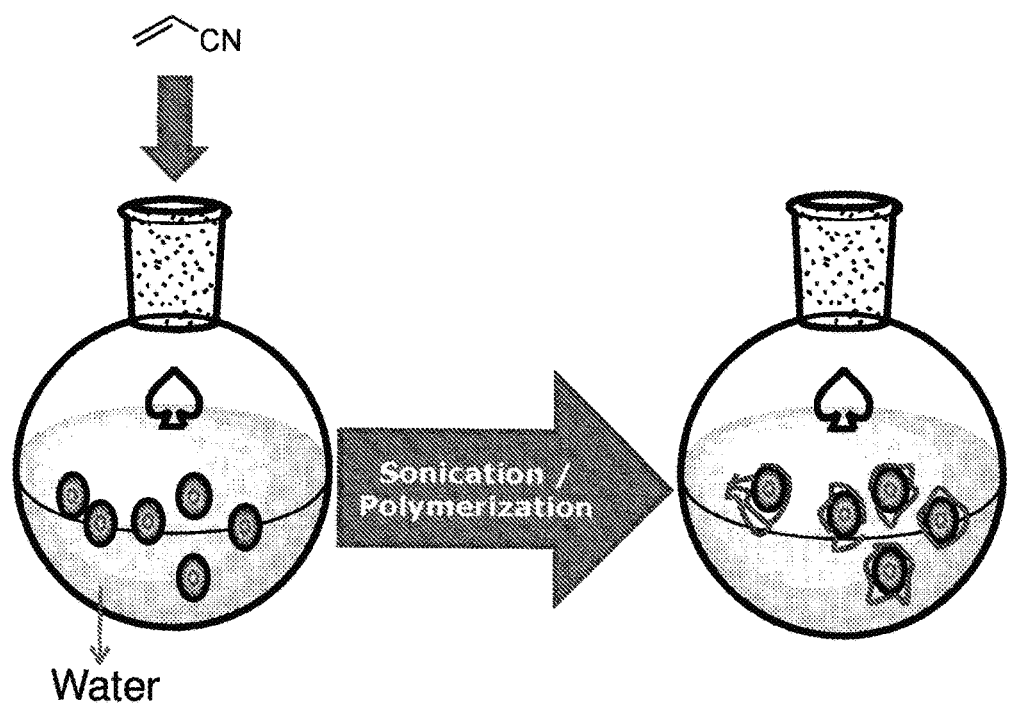
FIG. 1 is a schematic illustration of an emulsion polymerization reaction, showing the diffusion of the monomer according to one embodiment.
Figure 1:
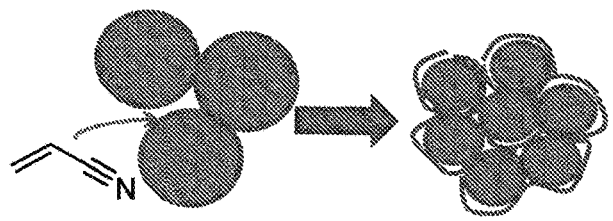

A first step in the present process is the use of emulsion polymerization. In the present method, inorganic particles serve as surfactant for the stabilisation of the emulsion. This method is generally known in the field as a "Pickering Emulsion". At this stage, droplets of monomers (e.g. acrylonitrile) and radical initiator form at the surface and inside the pores of the inorganic particles dispersed in a solvent, e.g. water and/or an alcohol, preferably water or a combination of water and an alcohol. The emulsion can be obtained, for instance, by sonication, high power stirring or any other methods for forming droplets on particles' surface. Polymerization is then initiated and results in the polymer forming on the surface of the primary particles to produce a nano-layer of polymer (e.g. poly(acrylonitrile), also called PAN) (see FIG. 1).

The dispersion obtained from the previous step after polymerization is then used directly for drying (e.g. spray-drying), i.e. without further purification. The temperature used in the drying step is above the boiling point of the solvent and volatile material to be removed. For example, the temperature a spray-dryer chamber is above 100° C., or between 100° C. and 120° C., or the temperature of the spray-dryer head is adjusted to between 120° C. and 250° C., or between 150° C. and 200° C. This process allows for the evaporation of solvent and residual volatile monomers. This step results in the particles being coated by a nano-layer of poly(acrylonitrile) polymer.

After drying, the obtained coated particles are subjected to polymer degradation, for instance, by thermal treatment (e.g. carbonization). For example, such a thermal treatment is accomplished using a ramp of temperature and gas optimised to achieve high electronic conductivity. For example, the ramp starts at a temperature close to room temperature and increases gradually (e.g. at a 3-10° C./min rate, preferably at a 5° C./min rate) up to a temperature of at least 200° C. In one example, the temperature reaches a first plateau and remains at this temperature for a period of 30 minutes to 2 hours (preferably about 1 hour) and then increases again gradually to reach a temperature of at least 500° C., or at least 600° C.

Any inert gas (argon, nitrogen, etc.) may be used. In one example, an argon/carbon dioxide mixture was used during carbonization and achieved high electronic conductivity. For instance, the gas can be an $Ar/CO_2$ mixture having a volume ratio of about 60:40 to about 90:10, or about 70:30 to about 80:20, or about 75:25.

The use of PAN as a polymer for allows the formation of an activated carbon layer (see Okada, K. et al., *Chem. Comm.*, 2011, 47 (26), 7422-7424). The presence of the activated carbon layer improves the electronic conductivity (electron transfer at the interface) and the interfacial stability of the material (see also Ding, Z. et al., *Phys. Chem. & Chem. Phys.*, 2011, 13 (33), 15127-15133).

Figure 2:
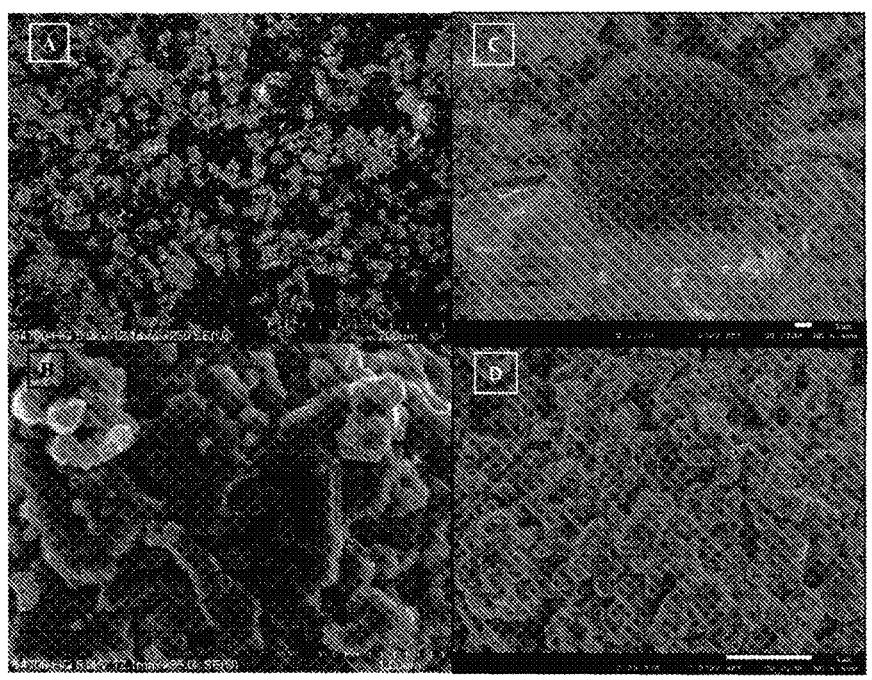
FIG. 2 shows four Scanning Electron Microscope (SEM) images of a carbon coating active particle according to one embodiment and comprising 1.5 wt % (a and b), and 1.0 wt % (c and d) of activated carbon.
Figure 3:
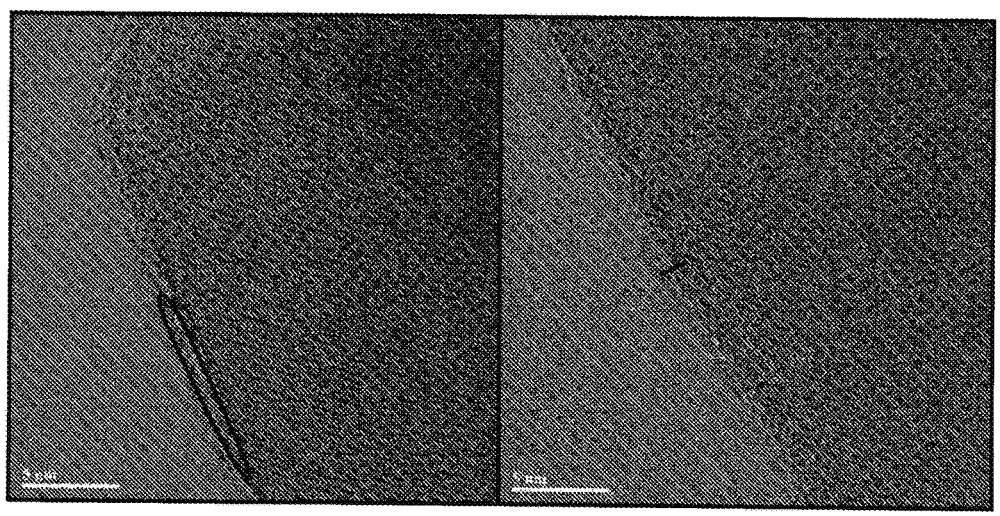
FIG. 3 shows two Transmission Electron Microscopy (TEM) images of a carbon coating active particle according to one embodiment and comprising 1.5 wt % of activated carbon.

For example, the coated particles are characterized by SEM and/or powder electronic conductivity. FIG. 2 shows the SEM images for one embodiment of the present application and demonstrate that the coating on LTO primary particles prepared by the present method is homogeneous. The carbon layer on the surface of the particles can also be observed by transmission electronic microscopy (TEM). The thickness of the carbon layer on the surface of the particles is below 20 nm, or below 10 nm, or even below 5 nm. For instance, FIG. 3 shows a thickness of an amorphous carbon layer around 1.0-1.5 nm.

Figures 4A, 4B, 4C, 4D:
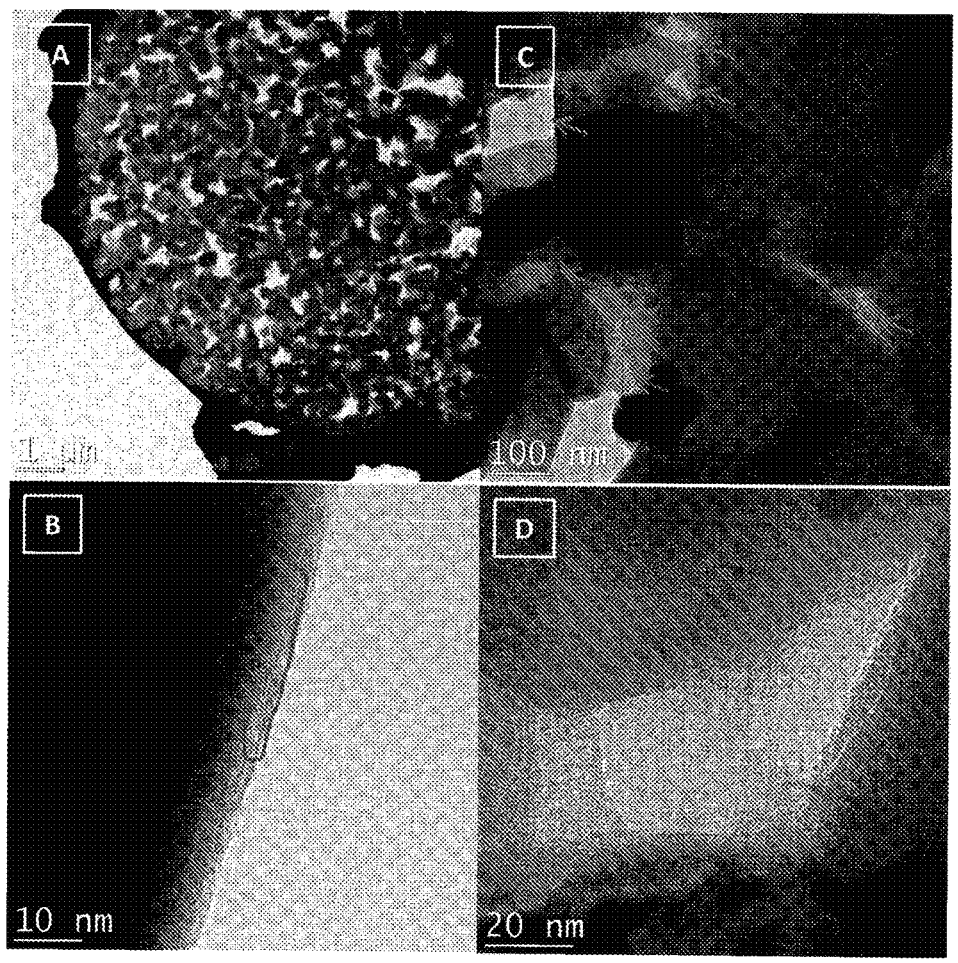
FIGS. 4A, 4B, 4C and 4D show four TEM images of a carbon coated active particle (1.0% activated carbon) according to one embodiment: a cross section of a carbon coating LTO particle (A); a layer of carbon inside a large pore (B); small pores filled with activated carbon (C); a zoom on a small pore (D).

In order to demonstrate the method's effectiveness to fill the active material pores with carbon, TEM images of the cross-section of a C-coated LTO particle (FIGS. 4A, 4B, 4C and 4D) were obtained. FIG. 4A shows the cross-section of a particles made by FIBE. Nickel nanoparticles located inside the activated carbon in FIG. 4A are a consequence of the FIBE procedure. On the pictures, the smallest pores (FIGS. 4C and 4D) are filled with carbon (arrows) and the biggest have a coating of 0.5-1.5 nm on the surface (FIGS. 4A and 4B) as determined by EDS. The filling of the pores by carbon enhances the electronic conductivity and allows for more efficient charge and discharge at high rate (10 C and more).

Moreover, one of the characteristics of the activated carbon coating is the nitrogen/carbon (N/C) ratio. An activated carbon coating formed by the carbonization of PAN is composed of fused aromatic rings comprising nitrogen and carbon atoms (nitrogen-containing polyaromatic structure, i.e. a graphene-like structure). In one embodiment, the coating is composed of about 4% to about 15%, or about 6% to about 11 wt %, of nitrogen, the rest being carbon. The nitrogen content is dependent, for instance, on the final carbonization temperature; a higher temperature is generally associated with a lower amount of nitrogen (see Rahaman, M. S. A. et al). Also, the surface area of the coated particles is between about 2 $m^2/g$ and about 20 $m^2/g$, or between about 4 $m^2/g$ and about 15 $m^2/g$, or between about 6 $m^2/g$ and about 10 $m^2/g$, as determined by BET. The surface area can be adjusted as a function of the molecular weight ($M_n$) of the poly(acrylonitrile), where a $M_n$ for the polymer leading to a surface area around 8 $m^2/g$ is preferred.

Electronic conductivity will be as low as $10^{-9}$ S/cm for an organic content below 1.0 wt %. In an exemplified embodiment, conductivity was measured on the compressed powder. For organic content equal or higher than 1.5 wt %, the conductivity can be even higher than $10^{-4}$ S/cm, due to the presence of free aggregation of carbon in the samples. The aggregation allows for a good contact between the particles but may reduce, in certain cases, the diffusion of lithium. For instance, an optimal total organic content could be between about 0.5 and about 1.5 wt % as determined by TGA analysis under He.

The carbon produced by the present method is amorphous as determined by RAMAN spectroscopy and shows a ratio D/G between 2 and 3.5.

For the preparation of an electrode comprising the coated particles, either for experimental analysis or as part of an electrochemical cell, the carbon-coated active particles are casted on a support, i.e. a current collector. In one example, the coated active particles are mixed with a binder and coated on the collector, for instance, as a slurry including also a solvent, which is dried after casting. The binder is selected taking into account the compatibility with the electrochemically active material, the current collector, electrolyte, and other parts of the electrochemical cell which could be in contact with the binder. For instance, the binder may be a water-soluble polymer binder or a non-aqueous polymer binder.

Examples of binders include SBR (styrene butadiene rubber) optionally with a thickening agent such as CMC (carbomethoxy cellulose), PAA (poly(acrylic acid)), PMMA (poly(methacrylic acid)), or a combination thereof, but also other known polymer binders. Examples of polymer binders may also include fluorinated polymers like polyvinylidene fluoride (PVDF) and polytetrafluoroethylene (PTFE). Other examples of binders include aqueous base binders like SBR (Styrene Butadiene Rubber), NBR (butadiene acrylonitrile rubber), HNBR (hydrogenated NBR), CHR (epichlorohydrin rubber), ACM (acrylate rubber), and the like. These may be combined with carbomethoxy cellulose or an acidic polymer like PAA or PMAA. The mixture to be coated optionally includes additional components like inorganic particles, ceramics, salts (e.g. lithium salts), conductive materials, and the like. In a preferred embodiment, no additional carbon source is added to the slurry before coating on the current collector.

The electrode produced by the present process is for use in the assembly of an electrochemical cell further comprising an electrolyte and a counter-electrode. The material composing the counter-electrode is selected as a function of the material used in the electrode. The electrolyte may be a liquid, gel or solid polymer electrolyte and comprises a lithium salt and/or is conductive to lithium ions.

EXAMPLES

The following non-limiting examples are illustrative embodiments and should not be construed as limiting the scope of the present application. These examples will be better understood with reference to the accompanying figures.

Example 1: Carbon Coating Process a) Emulsion Formation and Polymerization

LTO was used in the present example, but could be replaced by any other electrochemically active material. 20 g of LTO were introduced in a 250 mL round bottom flask and stirred by magnetic agitation. Then 100 mL of nanopure water were added to the active material in the flask. The slurry obtained was sonicated at a power of 70% for 6 min. After sonication, the slurry was cooled in an ice bath. A solution of 3 g of acrylonitrile and 25 mg of AIBN was added to the flask. The resulting slurry was sonicated for another 6 min at the same power (13% wt of monomer). The slurry was then degassed for 30 min using a stream of nitrogen. The slurry was then heated to 70° C. for 12 hours with high stirring under nitrogen.

b) Spray Drying

The slurry obtained in step (a) was heated to 180° C. After heating, the slurry was dried by spray-drying using a pump at 25% and a blower at 95-100%, percentages of the apparatus' full power.

c) Carbonization

The slurry was carbonized under air using a temperature ramp of from 25° C. to 240° C. at a rate of 5° C.min$^{-1}$, and further kept at 240° C. for 1 hour. Then the temperature was raised to 700° C. with a rate of 5° C.min$^{-1}$ under an atmosphere of Argon:$CO_2$ (75:25) or nitrogen.

Example 2: Carbon Coated LTO-C Electrode Production

The carbon coated LTO-C material prepared by the process of Example 1 was mixed with Styrene-Butadiene Rubber (SBR) binder (48% water solution) and PAA (250 000-500 000 g/mol) to form a slurry. The solid ratio of LTO-C/SBR/PAA was 96.0/2.5/1.5 (for a dry content in carbon from the coating of 1.0 wt %). The resulting slurry was coated on an aluminum foil with a thickness of 15 microns.

As a reference electrode, the LTO material without any carbon coating was mixed with conductive carbon agent, SBR (48% water solution) and Carboxymethyl cellulose (CMC, 1.5% water solution), at a LTO/Carbon/SBR/CMC solid weight ratio of 91.0/5.0/2.5/1.5. The resulting slurry was coated on an aluminum foil having a 15 microns thickness.

For comparison purposes, commercially available carbon coated LTO was mixed with a conductive carbon agent, SBR (48% water solution) and CMC (1.5% water solution), at an LTO/Carbon/SBR/CMC solid weight ratio of 91.0/5.0/2.5/1.5. The resulting slurry was casted on a 15 microns thick aluminum foil.

Example 3: Lithium LTO-C Half-Cells and LFP-LTO-C Full-Cells Production

Coin half and full cells were produced using the three electrodes of Example 2 in order to evaluate their electrochemical properties.

a) Lithium LTO-C Half Cells

Lithium half cells were produced using lithium metal as counter electrode and the LTO-C and reference electrodes as working electrodes. The cells were produced using Polyethylene (PE) separator, having a thickness of 16 microns, to separate the LTO electrode and the Lithium metal electrode. An electrolyte was prepared with 1.3 mol/kg of $LiPF_6$ and a mixture of propylene carbonate (PC), dimethyl carbonate (DMC), and ethyl methyl carbonate (EMC) as solvent, with a ratio PC/DMC/EMC of 4/3/3. Each cell was provided with 150 microliters of the resulting electrolyte.

b) LFP-LTO-C Full Cells

Lithium Iron Phosphate, $LiFePO_4$ (LFP) was mixed with conductive carbon agent and polyvinylidene difluoride (PVdF, 6% N-Methyl-2-pyrrolidone solution), with the solid ratio LFP/Carbon/PVdF of 95.0/5.0/5.0. The resulting slurry was coated on an aluminum foil with a thickness of 15 microns.

Full cells were produced using LFP electrode as cathode and the LTO electrode as anodes for each of the LTO electrodes of example 2. The same PE separator and $LiPF_6$-PC/DMC/EMC electrolyte than for the Lithium LTO-C Half Cells were used.

Example 4: Electrochemical Properties a) Characterization of Lithium Half-Cells Electrochemical capacities of the LTO-C and reference electrodes were measured in Lithium half cells to obtain the results shown in Table 1 below.

TABLE 1

Charge (Ch) and Discharge (Dis) capacities and efficiencies

| | Cycle | Ch. Capacity (mAh/g) | Dis. Capacity (mAh/g) | Ch./Dis. Efficiency (%) |
|---|---|---|---|---|
| Reference (SBR/CMC) | Formation 0.3 mA | 166.7 | 163.8 | 98.3 |
| | Nominal Ch./Dis. 0.6 mA | 164.0 | 163.3 | 99.6 |
| LTO-C 1.0% wt (SBR/PAA) | Formation 0.3 mA | 171.7 | 163.1 | 95.0 |
| | Nominal Ch./Dis. 0.6 mA | 163.5 | 162.1 | 99.2 |

Figure 5A:
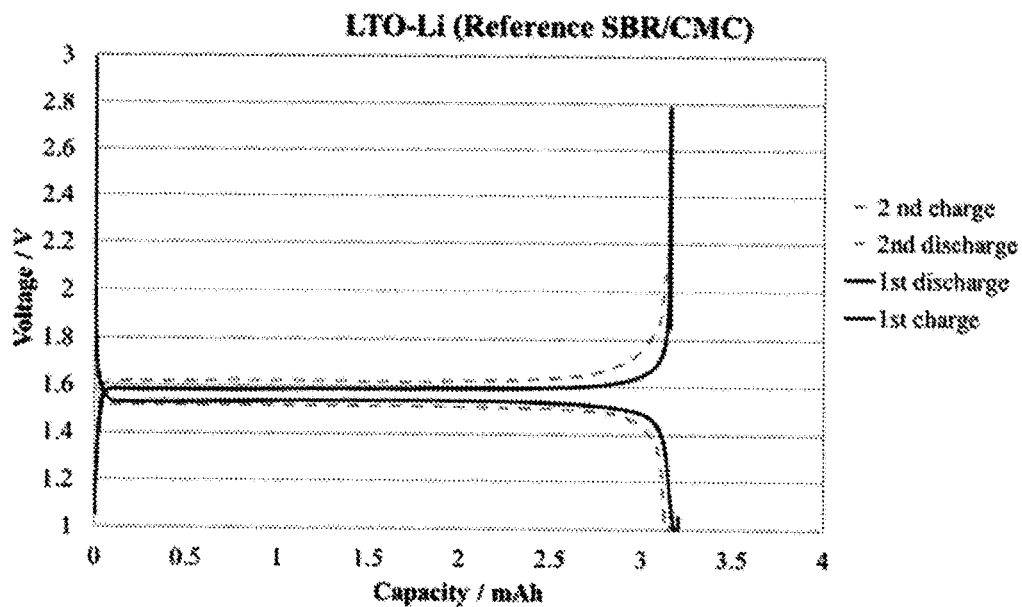
FIGS. 5A and 5B show the charge and discharge curves after the first and second cycles for a lithium half-cell comprising (a) a reference LTO electrode; and (b) a LTO electrode comprising carbon-coated active particles (1.0 wt. % C) according to one embodiment.
Figure 5B:
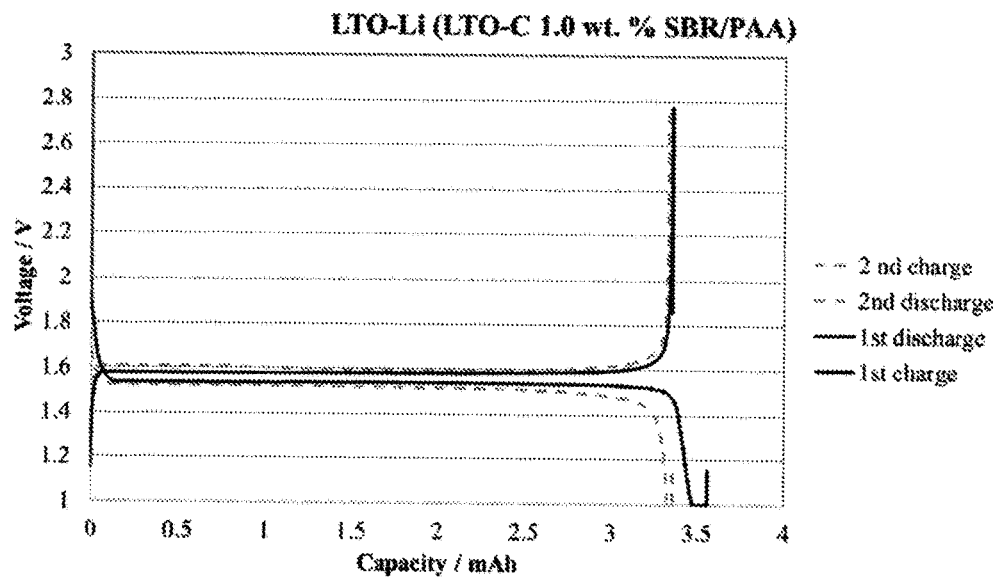

Charge/discharge cycling tests were performed with a Toyo battery test system (TOSCAT-3100™). For the first charge/discharge cycle, a 0.3 mA current was applied. Charge was done in Constant Current/Constant Voltage (CC-CV) mode, with a maximum voltage of 1.0 V and a cut-off current was 0.03 mA. Discharge was done in CC mode down to 2.7 V. For the second cycle, 0.6 mA was applied for both charge and discharge steps. As illustrated in FIGS. 5A and 5B, which present the charge and discharge curves for both the LTO-C (FIG. 5B) and reference Lithium Half-Cells (FIG. 5A), the LTO-C electrode showed a reduced voltage drop (or IR drop) when compared to result obtained with the reference electrode. As the internal resistance was lower for the LTO-C electrode, the carbon coating prepared by the present method would increase the conductivity between particles to reduce the internal resistance for the LTO-C electrode.

b) Charges/Discharge Curves in LFP-LTO Full Cells

Charge and discharge test was performed with LFP-LTO full cells. For the first charge/discharge cycle, a 0.3 mA current was applied. Charge was done in Constant Current/Constant Voltage (CC-CV) mode, with a maximum voltage of 2.4 V and a cut-off current was 0.03 mA. Discharge was done in CC mode down to 0.5 V. For the second cycle, 0.6 mA were applied for both charge and discharge steps.

Alternative Current (AC) Impedance was measured to evaluate the resistance of the LTO electrodes. The test was performed using a research-grade multi-channel potentiostat (Biologic VMP3®), using a frequency between 1 MHz-10 mHz and AC amplitude of 10 mV.

Figure 6A:
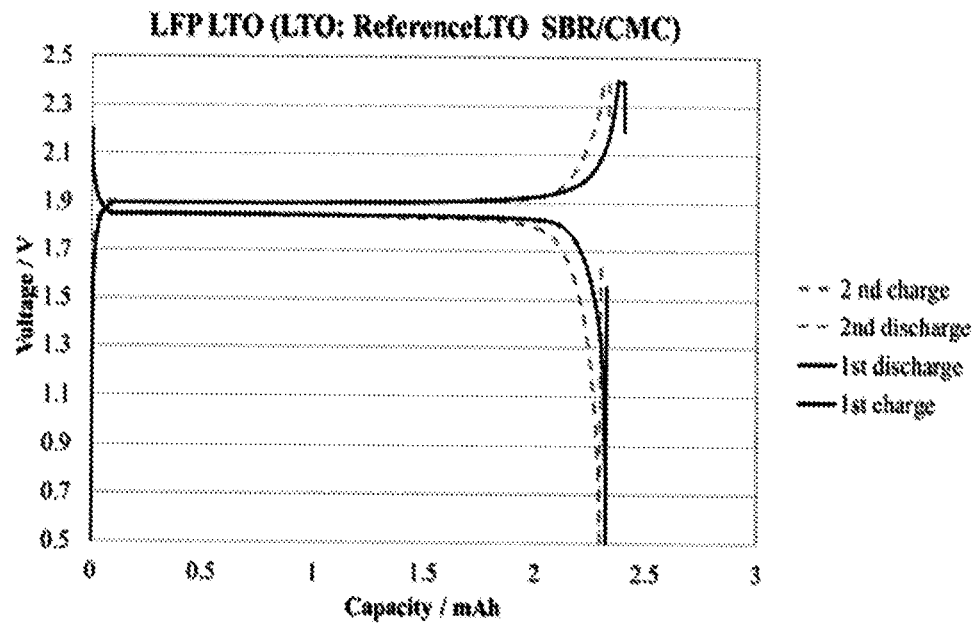
FIGS. 6A and 6B show the charge and discharge curves after the first and second cycles for a LFP-LTO full-cell comprising (a) a reference LTO electrode; and (b) a LTO electrode comprising carbon-coated active particles (1.0 wt % C) according to one embodiment.
Figure 6B:
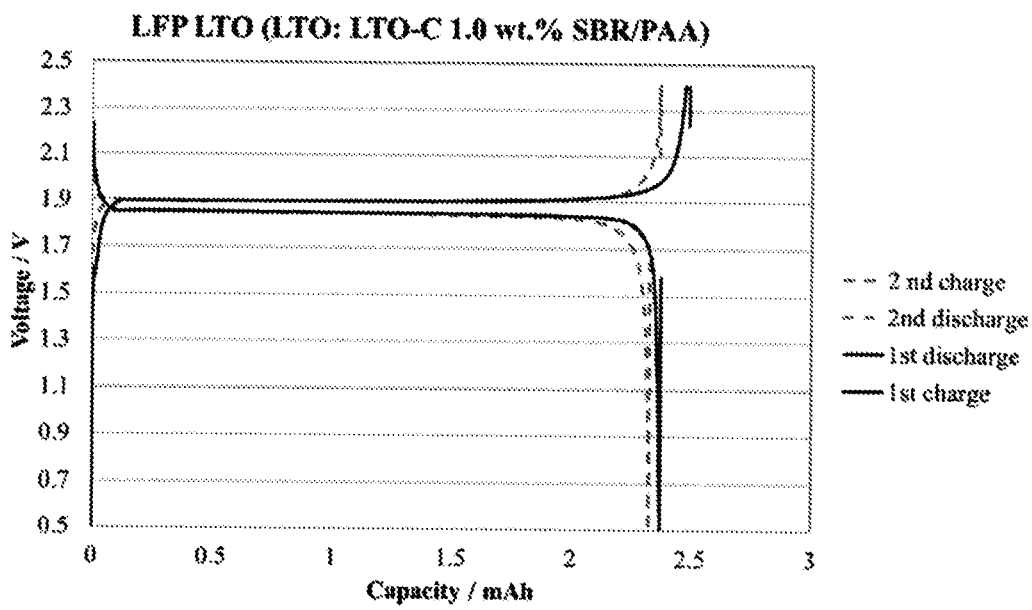

FIGS. 6A and 6B illustrate charge and discharge curves for full cells using the LTO-C electrode (FIG. 6B) or reference electrode (FIG. 6A) as anode. The curves show a steeper change occurring at the end of the charging and discharging tests of the LTO-C electrode. This confirms an improvement in lithium ion diffusion in the LTO-C electrode compared to the reference electrode.

c) Electrochemical Impedance of Lithium Half-Cells and LFP-LTO Full Cells

Figure 7A:
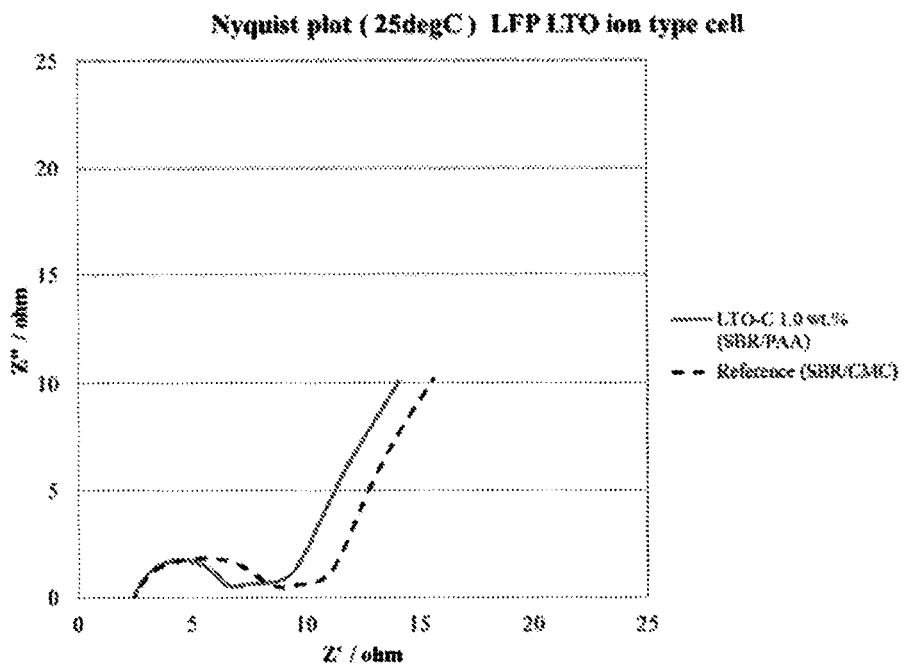
FIGS. 7A and 7B show Nyquist plots of a LTO electrode comprising carbon-coated active particles according to one embodiment (where the carbon content is 1.0 wt %), and a reference electrode comprised in (a) a LFP-LTO full-cell, and (b) a LTO lithium half-cell.
Figure 7B:
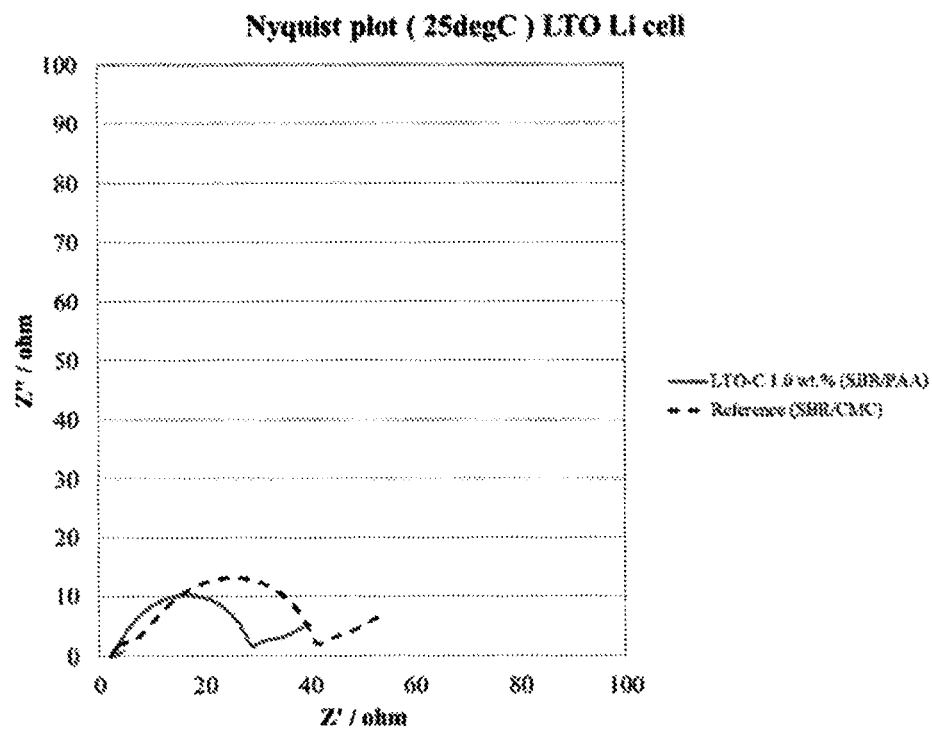

The electrochemical impedance for both the LTO-C and the reference electrodes was tested in LFP-LTO full cells (FIG. 7A) and Lithium half cells (FIG. 7B). FIGS. 7A and 7B present the Nyquist plots measured at 25° C. at State Of Charge (SOC)=50%, meaning that 50% of the capacity was charged.

According to FIGS. 7A and 7B, the LTO-C electrode showed less reaction resistance for charge and discharge reaction when compared to the reference electrode.

d) Charge and Discharge Capacities of LFP-LTO Full-Cells

Electrochemical capacities of reference electrode, commercial carbon-coated electrode and LTO-C electrode were measured in of LFP-LTO Full-Cells as shown in Table 2 below.

TABLE 2

Charge and Discharge capacities

| | | 0.2 C | 1 C | 2 C | 4 C | 10 C |
|---|---|---|---|---|---|---|
| Reference (SBR/CMC) | Charge | 100 | 91.9 | 86.9 | 78.9 | 27.4 |
| | Discharge | 100 | 94.1 | 90.3 | 84.6 | 71.7 |
| Commercial LTO-C (SBR/CMC) | Charge | 100 | 95.8 | 90.2 | 79.8 | 17.2 |
| | Discharge | 100 | 97.5 | 94.5 | 87.9 | 70.9 |
| LTO-C 1.0 wt % (SBR/PAA) | Charge | 100 | 96.3 | 91.4 | 85 | 63.5 |
| | Discharge | 100 | 95.5 | 93.4 | 81.2 | 80.0 |

Figure 8A:
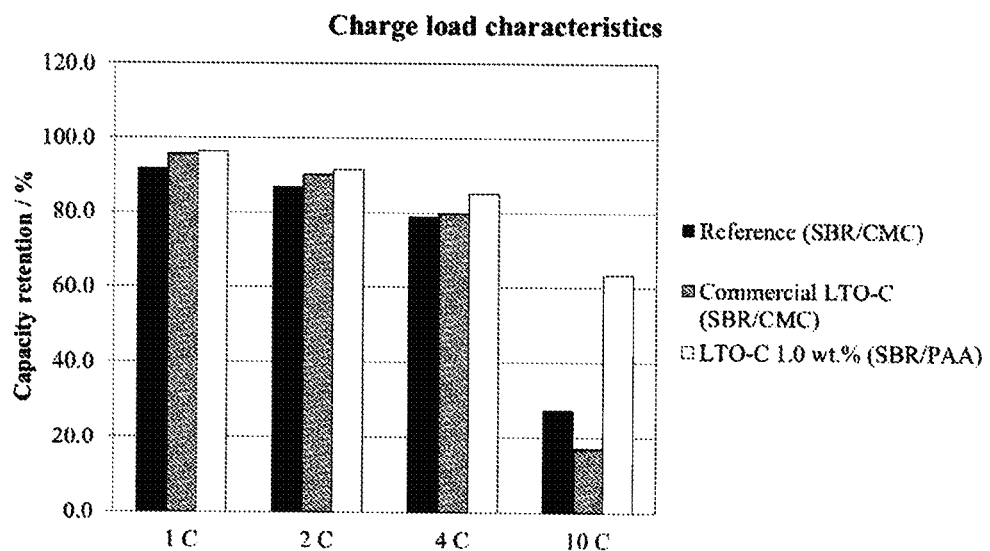
FIGS. 8A and 8B show the (a) charge and (b) discharge capacity retention at 1 C, 2 C, 4 C and 10 C for: a reference electrode; a commercial carbon coated LTO electrode; and a C-LTO electrode comprising carbon-coated active particles (1.0 wt % C) according to one embodiment.
Figure 8B:
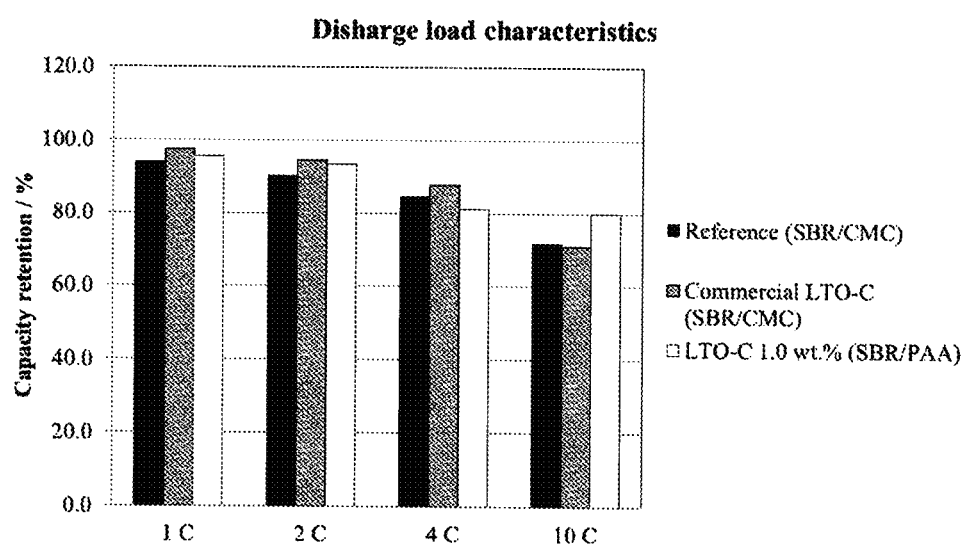

Load tests were performed to analyse the fast charging and discharging properties for the LFP-LTO full cells. Full cells with LTO-C electrode, reference electrodes and commercial electrodes were charged and discharged at 1 C, 2 C, 4 C, and 10 C. FIGS. 8A and 8B show that a 1 C current can charge or discharge the full capacity in 1 hour, while times for 2 C, 4 C and 10 C are respectively 30, 15 and 6 minutes.

For the charge load test (FIG. 8A), after full discharging at 0.2 C, LFP-LTO full cells were charged at 1 C, and then charged again at 0.2 C. Then the full-cells were discharged at 0.2 C and charged at 2 C.

For the discharge load test (FIG. 8B), after full charging at 0.2 C, LFP-LTO full cells were discharged at 1 C, and then discharged again at 0.2 C. Then the full cells were charged at 0.2 C and discharged at 2 C.

The capacity retention at xC was calculated using Equation 1 below.

Capacity retention=(Capacity at xC)/(Capacity at 0.2 C)×100   Equation 1

The capacity in the CC region was used for the calculation of charge load characteristics. According to FIGS. 8A and 8B, the LTO-C electrode showed a better capacity retention at 10 C for both the charging (FIG. 8A) and discharging (FIG. 8B) tests.

e) Direct Current Internal Resistance (DCIR) of LFP-LTO Full-Cells

DCIR was calculated using Equation 2 below.

$$DCIR = \frac{[V_{SOC50\%(xC)} - V_{SOC50\%(0.2C)}]}{[(\text{Current of } xC) - (\text{Current of } 0.2C)]} \quad \text{Equation 2}$$

Where $V_{SOC50\%(xC)}$ is the voltage at SOC50% measured at xC, and $V_{SOC50\%(0.2C)}$ is the voltage at SOC50% measured at 0.2 C.

DCIR for the reference, commercial carbon-coated and LTO-C electrodes were calculated and the results are shown in Table 3 below.

TABLE 3

Charge and Discharge DCIR

| | Charge DCR/ohm | Discharge DCR/ohm |
|---|---|---|
| Reference (SBR/CMC) | 25.5 | 31.0 |
| Commercial LTO-C (SBR/CMC) | 27.3 | 33.4 |
| LTO-C 1.0 wt % (SBR/PAA) | 18.9 | 21.5 |

Figure 9:
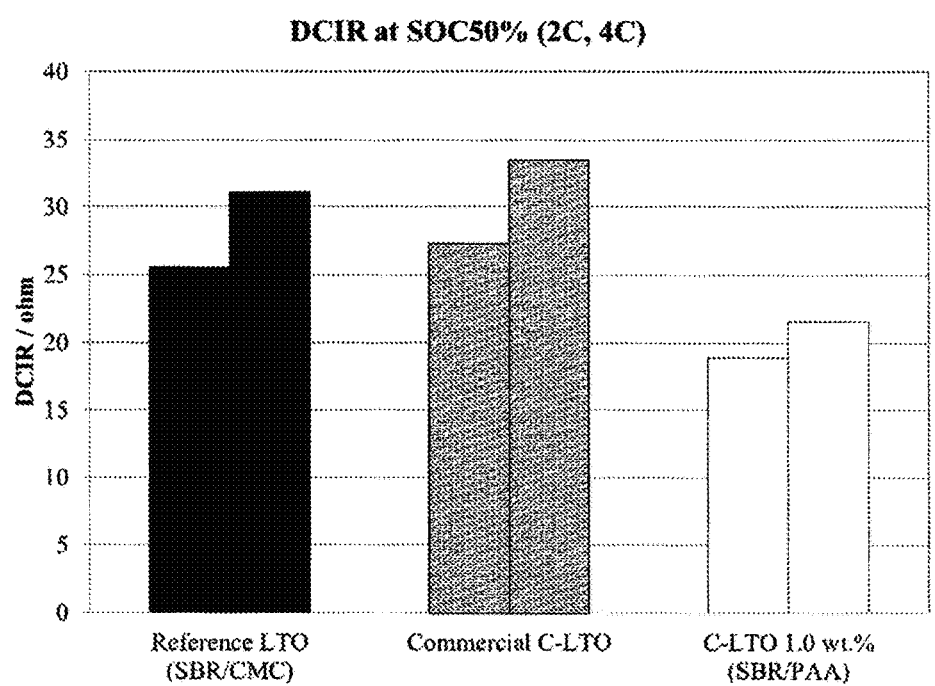
FIG. 9 shows charge and discharge Direct Current Internal Resistance (DCIR) for: a reference electrode; a commercial carbon-coated LTO electrode; and a C-LTO electrode comprising carbon-coated active particles (1.0 wt % C) according to one embodiment.

FIG. 9 shows the charge and discharge mean value of DCIR for 2 C and 4 C. According to FIG. 9, the LTO-C electrode showed a 30-35% lower internal resistance than the reference electrode or the commercial carbon coated LTO electrode. Therefore, in light of the above example, it appears that carbon-coated LTO-C electrodes such as described herein show improved electrochemical performances than conventional LTO electrodes, or even commercially available carbon coated LTO electrodes. The thin carbon coating allows for better conductivity, enhanced lithium diffusion and improved capacity retention at high current (10 C), but also provides a lower internal resistance or charge/discharge reaction resistance.

Numerous modifications could be made to any of the embodiments described above without departing from the scope of the present invention. Any references, patents or scientific literature documents referred to in this application are incorporated herein by reference in their entirety for all purposes.

The invention claimed is:

1. A process for producing carbon-coated particles, the process comprising the steps of:
   a. forming an emulsion by mixing particles, acrylonitrile monomers, and an aqueous solvent, said particles comprising an electrochemically active material;
   b. polymerizing the acrylonitrile monomers in the mixture of step (a) by emulsion polymerization;
   c. drying the particles from step (b) to form a nano-layer of poly(acrylonitrile) at the surface of the particles; and
   d. thermally treating the dried particles of step (c) to form the carbon-coated particles, said carbon consisting in a nano-layer of carbon comprising fibers on the surface of the particles.

2. The process of claim 1, wherein step (a) further comprises the addition of a polymerization initiator.

3. The process of claim 1, wherein step (b) further comprises:
   degassing the emulsion; and
   heating the emulsion under inert atmosphere at a temperature of 50° C. to 90° C. and for a time period within the range of from 5 to 15 hours.

4. The process of claim 1, wherein the emulsion is formed using sonication, high power stirring, or any high shear agitation technique.

5. The process of claim 1, wherein the drying step (c) comprises spray-drying the particles.

6. The process of claim 5, wherein the spray-drying is carried out at a temperature in the chamber above the boiling point of the solvent.

7. The process of claim 5, wherein the spray-drying is carried out at an applied temperature of between 120° C. and 250° C.

8. The process of claim 1, wherein the drying step (c) is carried out without any previous purification step.

9. The process of claim 1, wherein the thermal treatment step (d) is a carbonization step comprising heating the particle at a temperature of at least 500° C.

10. The process of claim 9, wherein the carbonization step comprises at least one temperature ramp.

11. The process of claim 9, wherein the carbonization step comprises:
progressively heating the particles having a nano-layer of poly(acrylonitrile) at the surface using a ramp of temperature from a temperature close to room temperature up to at least 200° C., with an increase rate of between 3° C.min$^{-1}$ and 10° C.min$^{-1}$;
keeping the temperature to at least 200° C. for a period of 30 minutes to 2 hours; and
further heating the particles under inert atmosphere with an increase rate of between 3° C.min$^{-1}$ and 10° C.min$^{-1}$ up to a final temperature of at least 500° C.

12. The process of claim 11, wherein the increase rate is of 5° C.min$^{-1}$.

13. The process of claim 11, wherein the final temperature is of at least 600° C.

14. The process of claim 11, wherein the inert atmosphere is selected from argon, nitrogen, carbon dioxide or a mixture thereof.

15. The process of claim 14, wherein the inert gas is a mixture of argon and carbon dioxide having a ratio Ar/CO$_2$ of between about 60:40 to about 90:10.

16. The process of claim 1, wherein the electrochemically active material comprises a material selected from the group consisting of titanates, lithium titanates, lithium metal phosphates, vanadium oxides, lithium metal oxides, and combinations thereof.

17. A process for producing carbon-coated LTO particles, the process comprising the steps of:
a. forming a Pickering emulsion comprising particles, acrylonitrile monomers, a polymerization initiator and an aqueous solvent, said particles comprising LTO as an electrochemically active material;
b. polymerizing the acrylonitrile monomers by emulsion polymerization to form poly(acrylonitrile) on a surface and inside pores of the particles;
c. spray drying the polymerized particles of step (b) to obtain dried particles having a nano-layer of poly (acrylonitrile) at their surface; and
d. carbonizing the dried particles of step (c) to form a carbon coating comprising carbon fibers on the surface of the particles.

18. Carbon-coated particles produced by the process of claim 1, wherein the particles are coated with a nano-layer of carbon comprising carbon fibers and polyaromatics consisting of carbon and nitrogen atoms.

* * * * *